(12) United States Patent
Chen et al.

(10) Patent No.: US 11,454,494 B2
(45) Date of Patent: Sep. 27, 2022

(54) TESTING APPARATUS AND TESTING METHOD

(71) Applicant: SKYVERSE TECHNOLOGY CO., LTD., Guangdong (CN)

(72) Inventors: Lu Chen, Guangdong (CN); Le Yang, Guangdong (CN); Yanzhong Ma, Beijing (CN); Chaoqian Zhang, Beijing (CN)

(73) Assignee: SKYVERSE TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 17/265,200

(22) PCT Filed: Jun. 20, 2019

(86) PCT No.: PCT/CN2019/092053
§ 371 (c)(1),
(2) Date: Feb. 1, 2021

(87) PCT Pub. No.: WO2020/024724
PCT Pub. Date: Feb. 6, 2020

(65) Prior Publication Data
US 2021/0302151 A1 Sep. 30, 2021

(30) Foreign Application Priority Data
Aug. 1, 2018 (CN) .......................... 201810866025.8

(51) Int. Cl.
*G01B 11/06* (2006.01)
*G01B 9/02015* (2022.01)
(Continued)

(52) U.S. Cl.
CPC ........ *G01B 11/0608* (2013.01); *G01B 9/0209* (2013.01); *G01B 9/02029* (2013.01);
(Continued)

(58) Field of Classification Search
CPC ............ G01B 9/02029; G01B 9/02057; G01B 9/0209; G01B 11/0608; G01B 11/0625; G01B 11/0675
See application file for complete search history.

(56) References Cited

U.S. PATENT DOCUMENTS 7,869,057 B2 * 1/2011 De Groot ............. G01B 9/0209
356/511
8,189,202 B2 * 5/2012 Liesener ............ G01B 9/02057
356/508
(Continued)

FOREIGN PATENT DOCUMENTS

CN 101802543 A 8/2010
CN 102077051 A 5/2011
(Continued)

OTHER PUBLICATIONS

International Search Report for PCT/CN2019/092053 dated Sep. 25, 2019, ISA/CN.

*Primary Examiner* — Michael A Lyons
(74) *Attorney, Agent, or Firm* — Yue (Robert) Xu; Apex Attorneys at Law, LLP

(57) ABSTRACT

Disclosed are a testing apparatus and a testing method. When the testing apparatus is used to test a sample (11) to be tested, a first detection apparatus (21) and a second detection apparatus (22) can be switched by means of an objective lens switching apparatus (20), so as to acquire height information and structure information of the sample (11) to be tested. In the process, the sample (11) to be tested does not need to be transferred between testing apparatuses, thus, not only is pollution potentially created in the process of transferring the sample (11) to be tested avoided, and the probability of the sample (11) to be tested being polluted in the testing process reduced, but also a region to be tested of the sample (11) to be tested does not need to be determined (Continued)

repeatedly, improving the testing speed for the sample (11) to be tested.

19 Claims, 7 Drawing Sheets

(51) Int. Cl.
  *G01B 9/0209* (2022.01)
  *G01B 9/02056* (2022.01)
(52) U.S. Cl.
  CPC ...... *G01B 9/02057* (2013.01); *G01B 11/0625* (2013.01); *G01B 11/0675* (2013.01)

(56) References Cited

U.S. PATENT DOCUMENTS

| | | | |
|---|---|---|---|
| 2011/0001988 A1 | 1/2011 | Pahk et al. | |
| 2011/0188048 A1 | 8/2011 | Pahk et al. | |
| 2013/0010286 A1 | 1/2013 | Zhao et al. | |
| 2017/0146339 A1 | 5/2017 | Wei et al. | |
| 2018/0364028 A1 | 12/2018 | Piel et al. | |
| 2018/0364465 A1* | 12/2018 | Heuck | G02B 27/142 |

FOREIGN PATENT DOCUMENTS

| | | |
|---|---|---|
| CN | 102147240 A | 8/2011 |
| CN | 102425998 A | 4/2012 |
| CN | 104422401 A | 3/2015 |
| CN | 105092585 A | 11/2015 |
| CN | 106840027 A | 6/2017 |
| CN | 107036539 A | 8/2017 |
| CN | 207556477 U | 6/2018 |
| CN | 108917626 A | 11/2018 |
| JP | 2015102450 A | 6/2015 |
| TW | I513952 B | 12/2015 |
| TW | I600876 B | 10/2017 |
| WO | 2009079334 A2 | 6/2009 |
| WO | 2009079334 A3 | 8/2009 |
| WO | 2017108400 A1 | 6/2017 |

* cited by examiner

TESTING APPARATUS AND TESTING METHOD

The present application is the U.S. national phase of International Application No. PCT/CN2019/092053, titled "TESTING APPARATUS AND TESTING METHOD", filed on Jun. 20, 2019, which claims priority to Chinese Patent Application No. 201810866025.8, titled "DETECTION APPARATUS AND DETECTION METHOD", filed on Aug. 1, 2018, with the China National Intellectual Property Administration, both of which are incorporated herein by reference in their entirety.

FIELD

The present disclosure relates to the field of measurement technology, and in particular to a detection apparatus and a detection method.

BACKGROUND

With the continuous development of semiconductor technology, processes of various semiconductor chips reach nanoscale. In addition, as the size of the semiconductor chips continually decreases, it is required to develop new processing technology to adapt to manufacture of semiconductor chips with small size.

Many procedures are required to manufacture a semiconductor chip. Chip non-conformance generated in any manufacture procedure may lead to failure of the whole chip, and subsequent manufacture procedures are wasted. Therefore, in a process of manufacturing a semiconductor chip, production staff generally introduce a chip detection procedure after a key manufacture procedure to measure a transverse dimension, film thickness information and height information of the semiconductor chip, so as to determine whether the current semiconductor chip meet requirements. In this way, an unqualified semiconductor chip can be excluded timely, thereby reducing production cost of semiconductor chips and improving a qualified ratio of the semiconductor chips.

In conventional technologies, a main objective of detecting a semiconductor chip is to obtain optical detection information of a sample to be detected by means of optical measurement. For example, the optical detection information of the sample to be detected may be obtained by means of a scanning white light interference detection apparatus, a film thickness detection apparatus and the like. The scanning white light interference detection apparatus is capable of forming an image of the semiconductor chip and measuring a height of the semiconductor chip in high precision, but cannot measure a film of the semiconductor chip. In this case, the semiconductor chip to be detected is required to be moved from the scanning white light interference detection apparatus to the film thickness detection apparatus, to measure the film thickness. There are usually multiple small chips integrated on a semiconductor chip, and each of the multiple small chips includes complex micro-structures. Therefore, after the switching between detection apparatuses, it is required to relocate an area to be detected on the semiconductor chip, which reduces a detection speed. In addition, movement of the semiconductor chip between apparatuses and multiple positioning processes increase a probability that the semiconductor chip is contaminated.

SUMMARY

In order to solve the above technical problems, a detection apparatus and a detection method are provided according to the present disclosure to improve a speed of detecting a semiconductor chip and reduce a probability that the semiconductor chip is contaminated in detection.

In order to realize the above technical objectives, the following technical solutions are provided according to the embodiments of the present disclosure.

A detection apparatus includes a carrying platform, a light source device, a first detection device, a second detection device, an objective lens switching device and a measuring device.

The carrying platform is configured to carry a sample to be detected.

The light source device is configured to emit detection light.

The first detection device is configured to receive the detection light and form first measurement light and first reference light, where the first measurement light, after being reflected by the sample to be detected, interferes with the first reference light.

The second detection device is configured to converge the detection light on a surface of the sample to be detected to form second measurement light.

The objective lens switching device is configured to switch between the first detection device and the second detection device to control the first detection device or the second detection device to be in an optical path.

The measuring device is configured to obtain height information of the sample to be detected based on the first measurement light reflected by the sample to be detected and the first reference light, and obtain structure information of the sample to be detected based on the second measurement light.

Optionally, the measuring device includes a first measuring device configured to obtain the height information.

The first measuring device is further configured to obtain imaging information of the sample to be detected based on second measurement light reflected by the sample to be detected.

Optionally, the first detection device includes an image sensor.

Optionally, the measuring device further includes a second measuring device.

The second measuring device is configured to obtain film thickness information of the sample to be detected based on the second measurement light reflected by the sample to be detected.

Optionally, the second measuring device includes a spectrometer.

Optionally, the detection apparatus further includes a stop.

The stop is configured to limit light entering the second measuring device.

Optionally, the detection apparatus further includes a first light splitter device. The first light splitter device is configured to split signal light, to project part of the signal light to the first measuring device and project part of the signal light to the second measuring device.

Optionally, the detection apparatus further includes a third converging lens. The third converging lens is configured to converge the first measurement light reflected by the sample to be detected, the first reference light and the second measurement light to the measuring device.

Optionally, the detection apparatus further includes a second light splitter device. The second light splitter device is configured to reflect the detection light to the sample to be detected and transmit the first measurement light reflected by the sample to de detected, the first reference light and the second measurement light.

Optionally, the first detection device includes a first converging lens, a support surface, a compensation surface and a first beam splitter plate.

The first converging lens and the support surface are arranged opposite to each other. The first converging lens is configured to converge the detection light to form converged light and transmit the converged light to the support surface.

The support surface and the compensation surface are arranged opposite to each other. The compensation surface is arranged at a side of the support surface away from the first converging lens. A reference surface is arranged at a side of the support surface facing the compensation surface.

The first beam splitter plate is arranged at a side of the compensation surface away from the support surface.

The converged light is transmitted through the support surface and the compensation surface sequentially and is incident on a surface of the first beam splitter plate. Light reflected by the first beam splitter plate forms the first reference light, and light transmitted by the first beam splitter plate forms the first measurement light. The first reference light is reflected by the reference surface and the first beam splitter plate sequentially after being transmitted through the compensation surface and interferes with the first measurement light reflected by the sample to be detected.

The compensation surface is configured to perform phase compensation on the first reference light and the first measurement light to cause the first reference light and the first measurement light to meet an interference condition.

Optionally, the objective lens switching device or the carrying platform is further configured to move along a direction perpendicular to a surface of the sample to be detected.

The carrying platform is further configured to move along a direction parallel to the surface of the sample to be detected.

Optionally, the detection apparatus further includes a piezoelectric sensor.

The piezoelectric sensor is arranged a side of the objective lens switching device facing the carrying platform. The piezoelectric sensor is configured to drive the objective lens switching device to move along the direction perpendicular to the surface of the sample to be detected.

A detection method is performed by the detection apparatus according to any one of the above. The detection method includes:

arranging a sample to be detected on the carrying platform, and performing measurement processing on the sample to be detected, where the measurement processing includes at least one of first measurement processing and second measurement processing.

The first measurement processing performed on the sample to be detected includes:

switching, by the objective lens switching device, the second detection device into the optical path, and obtaining, by the measuring device, structure information of the sample to be detected based on the second measurement light reflected by the sample to be detected. The second measurement processing performed on the sample to be detected includes: switching, by the objective lens switching device, the first detection device into the optical path, and obtaining, by the measuring device, height information of the sample to be detected based on the first measurement light reflected by the sample to be detected and the first reference light.

Optionally, the measuring device includes a first measuring device. The first measuring device is further configured to obtain imaging information of the sample to be detected.

The measurement processing includes the first measurement processing. The structure information includes the imaging information of the sample to be detected. The step of obtaining the structure information includes: obtaining, by the first measuring device, the imaging information based on the second measurement light reflected by the sample to be detected.

The measurement processing further includes: determining an area to be measured of the sample to be detected based on the imaging information.

Optionally, the area to be measured includes an area for height measurement. The measurement processing includes performing the second measurement processing on the sample to be detected.

The step of obtaining the height information includes: obtaining interference information of the area for height measurement based on the first measurement light and the first reference light, and obtaining the height information of the area for height measurement based on the interference information.

Optionally, the measuring device further includes a second measuring device, the area to be measured includes an area for film thickness measurement, the structure information obtained in the first measurement processing further includes film thickness information, and the step of obtaining the structure information further includes: obtaining, by the second measuring device, film thickness information of the sample to be detected based on the second measurement light reflected by the sample to be detected.

Optionally, the measurement processing further includes: obtaining a transverse dimension of the sample to be detected based on the imaging information.

Optionally, in a case that the area to be measured includes multiple areas for height measurement, the measurement processing further includes: moving the sample to be detected by the carrying platform, and performing the second measurement processing on each of the multiple areas for height measurement.

In a case that the area to be measured includes multiple areas for film thickness measurement, the first measurement processing further includes: moving the sample to be detected by the carrying platform, and obtaining film thickness information of each of the multiple areas for film thickness measurement based on the second measurement light.

It can be seen from the above technical solutions that a detection apparatus and a detection method are provided according to the embodiments of the present disclosure. The detection apparatus is provided with a carrying platform, a light source device, a measuring device, an objective lens switching device, a first detection device and a second detection device. The objective lens switching device is configured to switch between the first detection device and the second detection device to control the first detection device or the second detection device to be in an optical path. In a case that the first detection device is in the optical path, the measuring device may obtain height information of a sample to be detected based on first measurement light reflected by the sample to be detected and first reference light. In a case that the second detection device is in the optical path, the measuring device may obtain structure information of the sample to be detected based on second measurement light reflected by the sample to be detected. Therefore, in detecting the sample to be detected by the detection apparatus, the structure information or the height information of the sample to be detected can be obtained by switching between the first detection device and the second detection device with the objective lens switching device. In the entire process, it is not required to transfer the sample to be detected between detection apparatuses, which avoids contamination that may be caused in transferring the sample to be detected and reduces a probability that the sample to be detected is contaminated in the detection. In addition, it is not required to redetermine an area to be measured of the sample to be detected, which improves a speed of detecting the sample to be detected.

BRIEF DESCRIPTION OF THE DRAWINGS

In order to more clearly describe the technical solutions in the embodiments of the present disclosure or the technical solutions in the conventional technologies, drawings to be used in the description of the embodiments of the present disclosure or the conventional technologies are briefly described hereinafter. It is apparent that the drawings described below show merely the embodiments of the present disclosure, and those skilled in the art may obtain other drawings according to the provided drawings without any creative effort.

DETAILED DESCRIPTION OF EMBODIMENTS

Technical solutions of the embodiments of the present disclosure are clearly and completely described below in conjunction with the drawings of the embodiments of the present disclosure. Apparently, the embodiments described in the following are only some embodiments of the present disclosure, rather than all the embodiments. Any other embodiments obtained by those skilled in the art based on the embodiments in the present disclosure without any creative effort fall within the protection scope of the present disclosure.

Figure 1:
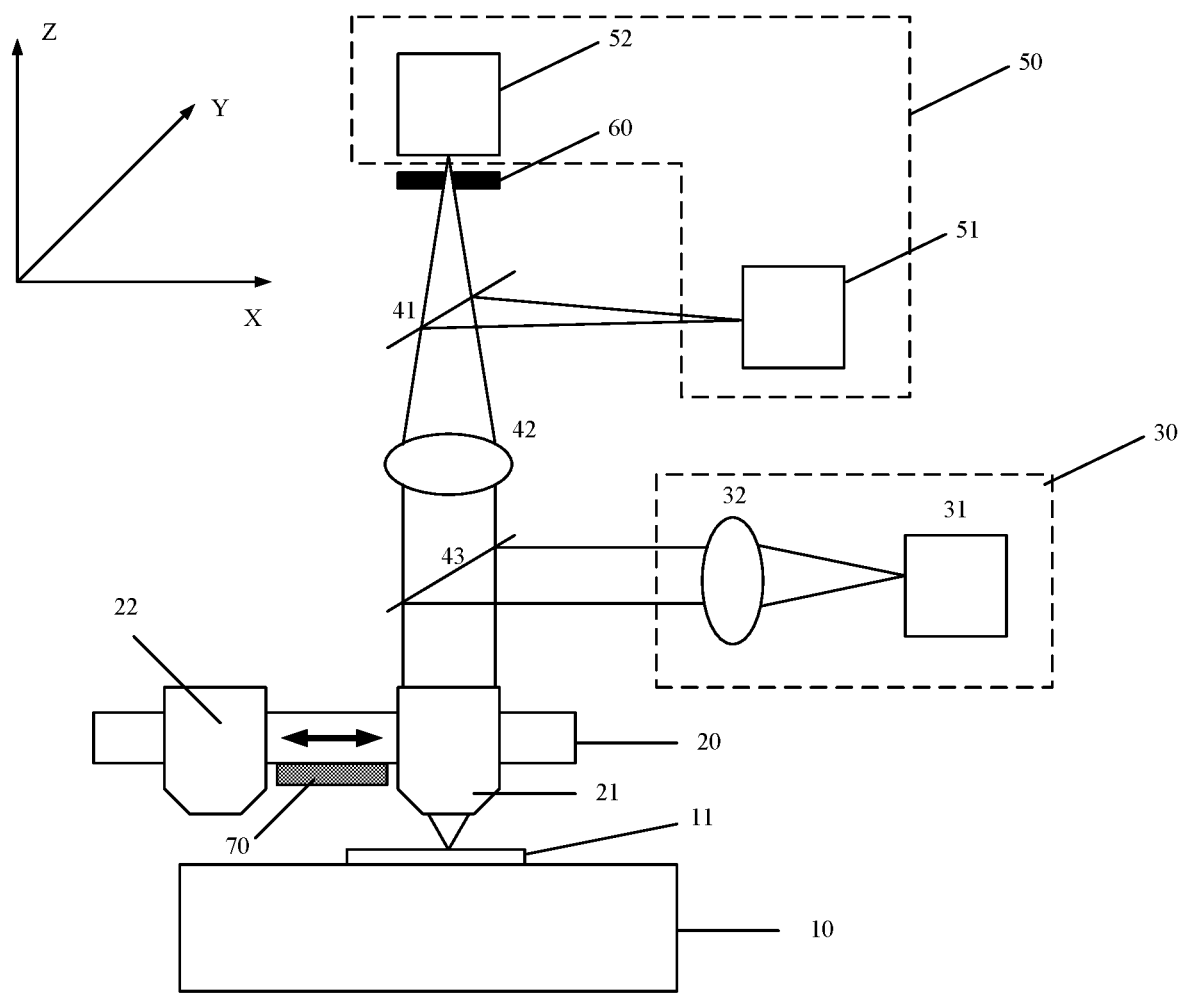
FIG. 1 is a schematic structural diagram of a detection apparatus according to an embodiment of the present disclosure.

A detection apparatus is provided according to an embodiment of the present disclosure. As shown in FIG. 1, the detection apparatus includes a carrying platform 10, a light source device 30, a first detection device 21, a second detection device 22, an objective lens switching device 20 and a measuring device 50.

The carrying platform 10 is configured to carry a sample to be detected.

The light source device 30 is configured to emit detection light.

The first detection device 21 is configured to receive the detection light and form first measurement light and first reference light, where the first measurement light, after being reflected by the sample to be detected, interferes with the first reference light.

The second detection device 22 is configured to converge the detection light on a surface of the sample to be detected to form second measurement light.

The objective lens switching device 20 is configured to switch between the first detection device 21 and the second detection device 22 to control the first detection device 21 or the second detection device 22 to be in an optical path.

The measuring device 50 is configured to obtain height information of the sample 11 to be detected based on the first measurement light reflected by the sample to be detected and the first reference light, and obtain structure information of the sample to be detected based on the second measurement light.

A coordinate system XYZ in FIG. 1 is a right-handed coordinate system established by taking a direction perpendicular to the surface of the sample 11 to be detected and pointing to the objective lens switching device 20 as a positive direction of the Z axis.

Due to the objective lens switching device 20, in detecting the sample to be detected by the detection apparatus, the height information and the structure information of the sample to be detected can be obtained by switching between the first detection device 21 and the second detection device 22 with the objective lens switching device 20. In the process, it is not required to transfer the sample to be detected between detection apparatuses, which avoids pollution that may be caused in transferring the sample to be detected and reduces a probability that the sample to be detected is contaminated in the detection. In addition, it is not required to redetermine an area to be detected of the sample to be detected, which improves a speed of detecting the sample to be detected.

It should be noted that the measuring device 50 has at least an imaging function. In a case that the first detection device 21 is in the optical path, the first detection device 21, after processing the detection light, may form the first reference light that is capable of forming an interference pattern and the first measurement light that carries information of the sample to be detected, and thus interferometric three-dimensional measurement may be performed on the sample to be detected based on the obtained interference information of the sample to be detected, thereby obtaining height information of the surface of the sample to be detected.

In a case that the second detection device 22 is in the optical path, the second detection device 22 processes the detection light to form second measurement light. The measuring module 50 obtains imaging information of the sample to be detected after receiving the second measurement light.

In a case that the measuring module 50 further has a function of obtaining a beam spectrum, the second detection device 22 may further measure a film thickness of the sample to be detected with a reflection spectrum method based on the obtained second measurement light.

In view of the above, optionally, in an embodiment of the present disclosure, referring to FIG. 1, the measuring device 50 includes a first measuring device 51 configured to obtain the height information.

The first measuring device 51 is further configured to obtain imaging information of the sample to be detected based on the second measurement light reflected by the sample to be detected. In this case, optionally, the first measuring device includes an image sensor, such as a CCD imager sensor or a CMOS image sensor.

In a case that the measuring module 50 is further required to have a function of obtaining a beam spectrum, optionally, also referring to FIG. 1, the measuring device 50 further includes a second measuring device 52.

The second measuring device 52 is configured to obtain film thickness information of the sample to be detected based on the second measurement light reflected by the sample to be detected.

In the embodiment, the second measuring device 52 includes a spectrometer.

In addition, in performing interferometric three-dimensional measurement on the sample 11 to be detected, a distance between the sample 11 to be detected and the first detection device 21 is generally required to vary continually in the detection, to obtain interference fringes with changing patterns based on obtained interference information. Therefore, the objective lens switching device 20 or the carrying platform 10 is further configured to move along a direction (the Z axis direction as shown in FIG. 1) perpendicular to a surface of the sample 11 to be detected.

The carrying platform 10 is further configured to move along a direction parallel to the surface of the sample 11 to be detected (that is, move within the XY plane as shown in FIG. 1).

Figure 2:
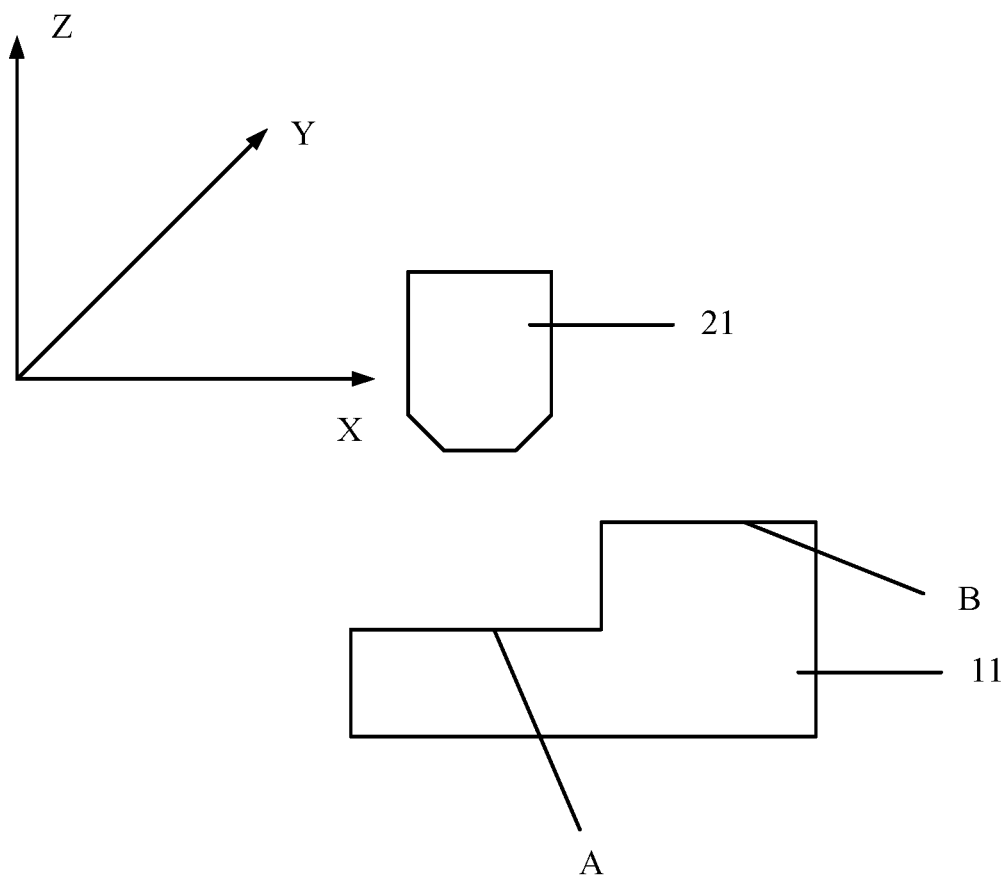
FIG. 2 is a schematic diagram of performing interferometric three-dimensional measurement on a sample to be detected according to an embodiment of the present disclosure.
Figure 3:
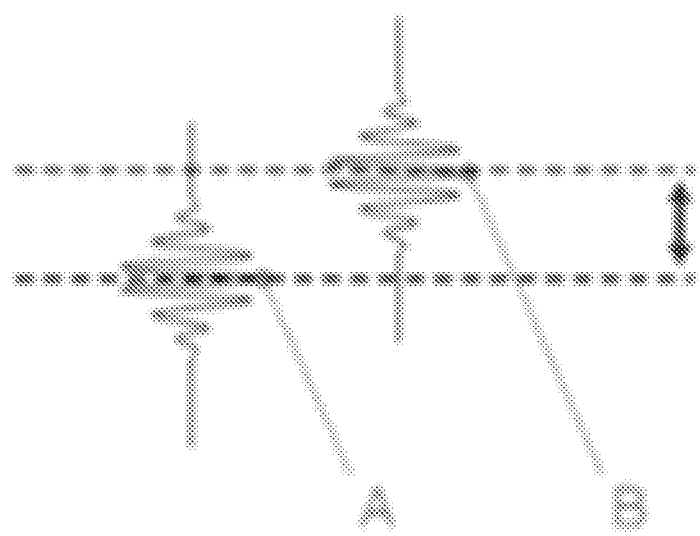
FIG. 3 is a schematic diagram of interference patterns corresponding to interference information obtained by performing interferometric three-dimensional measurement on a surface A and a surface B of a sample to be detected according to an embodiment of the present disclosure.

In performing interferometric three-dimensional measurement on the sample 11 to be detected by means of the detection apparatus, preferably, the objective lens switching device 20 or the carrying platform 10 is controlled to move along the direction perpendicular to the surface of the sample 11 to be detected in the measurement, such that multiple measurement results of interference information of measurement surfaces on the surface of the sample 11 to be detected can be obtained. Referring to FIG. 2 and FIG. 3, FIG. 2 is a schematic diagram showing the first detection device 21 performing interferometric three-dimensional measurement on a surface A and a surface B of the sample 11 to be detected. FIG. 3 shows interference patterns corresponding to interference information obtained by performing interferometric three-dimensional measurement on the surface A and the surface B of the sample 11 to be detected. As shown in FIG. 3, the interference patterns corresponding to the interference information of the surface A and the surface B fluctuate with a variation in the distance between the sample 11 to be detected and the first detection device 21. A brightness peak value of fringes in an interference pattern may serve as a relative height of a measurement surface. Then the interferometric three-dimensional measurement is repeated on a new measurement surface to obtain a relative height of the new measurement surface. Finally the relative heights of the two measurement surfaces are compared with each other to obtain a height distribution of an area to be detected.

Movement of the carrying platform 10 along the direction parallel to the surface of the sample 11 to be detected can adjust the area to be detected (that is an area to which the detection light or the first measurement light is incident) on the surface of the sample 11 to be detected, to avoid contamination that may be caused by directly moving the sample 11 to be detected.

In a case that the distance between the sample 11 to be detected and the first detection device 21 varies by the objective lens switching device 20 moving along the direction perpendicular to the surface of the sample 11 to be detected, high-precision position movement may be realized by providing a piezoelectric sensor 70. The piezoelectric sensor 70 is arranged at a side of the objective lens switching device 20 facing the carrying platform 10. The piezoelectric sensor 70 is configured to drive the objective lens switching device 20 to move along the direction perpendicular to the surface of the sample 11 to be detected. Apparently, in some embodiments of the present disclosure, the distance between the sample 11 to be detected and the first detection device 21 may also vary by moving the carrying platform 10 upward and downward to drive the sample 11 to be detected to move, which is not limited in the present disclosure.

It should be noted that the first detection device 21 is mainly configured to process the detection light to form the first measurement light incident to the sample 11 to be detected and the first reference light. In addition, the first measurement light and the first reference light meet an interference condition after the first measurement light is reflected by the sample 11 to be detected; therefore, the first detection device 21 is required to have at least functions of light splitting and phase compensation.

Figure 4:
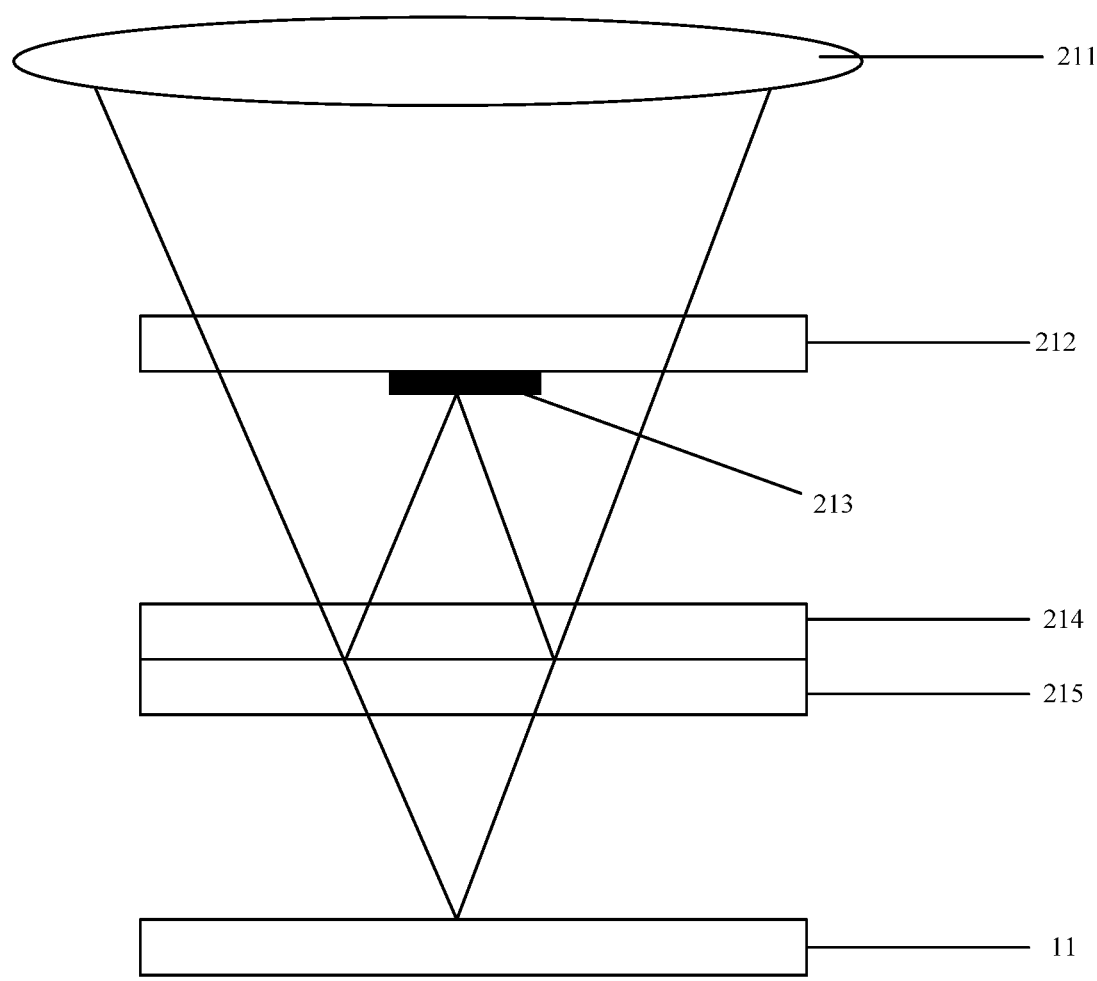
FIG. 4 is a schematic structural diagram of a first measuring device according to an embodiment of the present disclosure.

A possible structure of the first detection device 21 is provided according to an embodiment of the present disclosure. As shown in FIG. 4, the first detection device 21 includes a first converging lens 211, a support surface 212, a compensation surface 214 and a first beam splitter plate 215.

The first converging lens 211 and the support surface 212 are arranged opposite to each other. The first converging lens 211 is configured to converge the detection light to form converged light and transmit the converged light to the support surface 212.

The support surface 212 and the compensation surface 214 are arranged opposite to each other. The compensation surface 214 is arranged at a side of the support surface 212 away from the first converging lens 211. A reference surface 213 is arranged at a side of the support surface 212 facing the compensation surface 214.

The first beam splitter plate 215 is arranged at a side of the compensation surface 214 away from the support surface 212.

The converged light is transmitted through the support surface 212 and the compensation surface 214 sequentially and is incident on a surface of the first beam splitter plate 215. Light reflected by the first beam splitter plate 215 forms the first reference light, and light transmitted by the first beam splitter plate 215 forms the first measurement light. The first reference light is reflected by the reference surface 213 and the first beam splitter plate 215 sequentially after being transmitted by the compensation surface 214 and interferes with the first measurement light reflected by the sample 11 to be detected.

The compensation surface 214 is configured to perform phase compensation on the first reference light and the first measurement light to cause the first reference light and the first measurement light to meet an interference condition.

As can be seen from FIG. 4, the number of times the first reference light being transmitted by the compensation surface 214 is different from that of the first measurement light being transmitted by the compensation surface 214, such that the compensation surface 214 performs phase compensation on the first reference light and the first measurement light, so as to conform the first reference light and the first measurement light to the interference condition.

Functions of the first converging lens 211, the support surface 212, the compensation surface 214 and the first beam splitter plate 215 may be realized by an interference objective lens integrated with these functions or by independent optical elements. The interference objective lens generally includes the first converging lens 211 and an interference unit that is arranged between the first converging lens 211 and the sample 11 to be detected. A structure of the interference unit is similar to or the same as the structure of the support surface 212, the compensation surface 214 and the first beam splitter plate 215 shown in FIG. 4. The structure and an implementation of the first detection device 21 are not limited in the present disclosure and may be determined according to actual conditions.

In a case that functions of three-dimensional interference measurement, optical imaging measurement and reflection spectrum film thickness measurement are all integrated in the detection apparatus and the measuring device 50 includes the first measuring device 51 and the second measuring device 52, with continued reference to FIG. 1, the detection apparatus further includes a first light splitter device 41. The first light splitter device 41 is configured to split signal light, to project part of the signal light to the first measuring device 51 and project part of the signal light to the second measuring device 52. In the embodiment, the signal light refers to the first measurement light and the first reference light, or to the second measurement light. Signal light projected to the first measuring device 51 includes the first measurement light and the first reference light, or part of the second measurement light. Signal light projected to the second measuring device 52 includes part of the second measurement light.

The first light splitter device 41 is a semi-reflective and semi-transmissive lens, and the second light splitter device 43 is a semi-reflective and semi-transmissive lens.

In the embodiment, with continued reference to FIG. 1, the detection apparatus further includes a third converging lens 42. The third converging lens 42 is configured to converge the first measurement light reflected by the sample to be detected, the first reference light and the second measurement light to the measuring device.

In the embodiment, with continued reference to FIG. 1, the detection apparatus further includes a second light splitter device 43. The second light splitter device 43 is configured to reflect the detection light to the sample to be detected and transmit the first measurement light reflected by the sample to de detected, the first reference light and the second measurement light.

In the embodiment, the second light splitter device 43 is configured to reflect the detection light to the detection device. The detection device converges the detection light on the surface of the sample to be detected. The first measurement light reflected by the sample to be detected, the first reference light and the second measurement light are transmitted by the second spectrometer 43 to reach the first light splitter device.

In the embodiment, the light source device 30 includes a white light source 31 and a shaping lens group 32.

The white light source 31 is configured to emit detection white light.

The shaping lens group 32 is configured to shape the detection white light to obtain the detection light.

The detection method according to the embodiments of the present disclosure is described below. For the detection method described below, one may refer to the detection apparatus described above.

Figure 5:
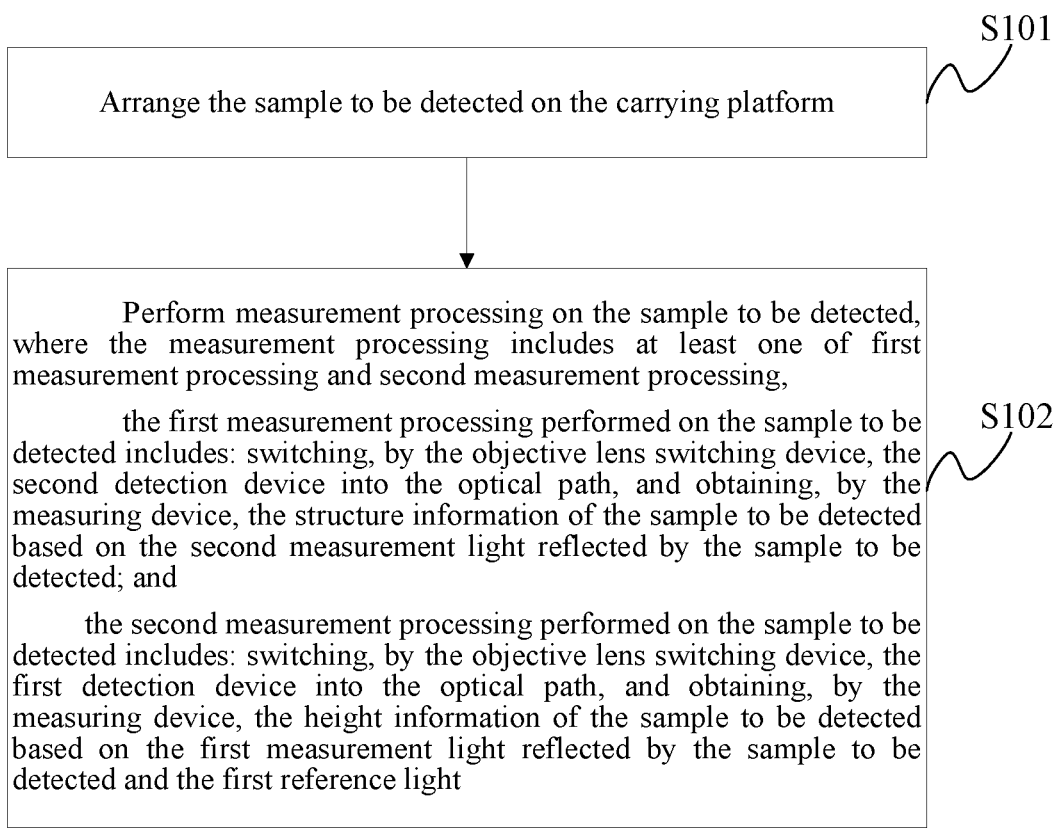
FIG. 5 is a flowchart of a detection method according to an embodiment of the present disclosure.

Accordingly, a detection method is further provided according to an embodiment of the present disclosure. As shown in FIG. 5, the detection method is performed by the detection apparatus according any one of the above embodiments. The detection method includes the following steps S101 and S102.

In step S101, the sample to be detected is arranged on the carrying platform.

In step S102, measurement processing is performed on the sample to be detected. The measurement processing includes at least one of first measurement processing and second measurement processing.

The first measurement processing performed on the sample to be detected includes: switching, by the objective lens switching device, the second detection device into the optical path, and obtaining, by the measuring device, structure information of the sample to be detected based on the second measurement light reflected by the sample to be detected. The second measurement processing performed on the sample to be detected includes: switching, by the objective lens switching device, the first detection device into the optical path, and obtaining, by the measuring device, height information of the sample to be detected based on the first measurement light reflected by the sample to be detected and the first reference light.

In detecting the sample to be detected by means of the detection apparatus, the height information and the structure information of the sample to be detected can be obtained by switching between the first detection device and the second detection device with the objective lens switching device. In the process, it is not required to transfer the sample to be detected between detection apparatuses, which avoids contamination that may be caused in transferring the sample to be detected and reduces a probability that the sample to be detected is contaminated in the detection. In addition, it is not required to redetermine an area to be detected of the sample to be detected, which improves a speed of detecting the sample to be detected.

Generally, in order to perform interferometric three-dimensional measurement and imaging measurement on the sample to be detected, the measuring device is required to have at least an imaging function. That is, in a case that the measuring device includes a first measuring device and the first measuring device is further configured to obtain imaging information of the sample to be detected: the measurement processing includes the first measurement processing, and the structure information includes imaging information of the sample to be detected; and the step of obtaining the structure information includes: obtaining, by the first measurement device, the imaging information based on the second measurement light reflected by the sample to be detected.

The measurement processing further includes: determining an area to be measured of the sample to be detected based on the imaging information.

In a case that the first measuring device is further configured to obtain the imaging information of the sample to be detected, a transverse dimension of the sample to be detected may further be obtained by analyzing the imaging information of the sample to be detected. That is, the step of the measurement processing further includes: obtaining the transverse dimension of the sample to be detected based on the imaging information.

Optionally, the area to be measured includes an area for height measurement and the measurement processing includes performing the second measurement processing on the sample to be detected.

The step of obtaining the height information includes: obtaining interference information of the area for height measurement based on the first measurement light and the first reference light, and obtaining height information of the area for height measurement based on the interference information.

In a case that it is required to measure a film thickness of the sample to be detected with a reflection spectrum method, the measuring module is further required to have a function of obtaining a beam spectrum. That is, in a case that the measuring device further include a second measuring device: the area to be measured includes an area for film thickness measurement, and the structure information obtained through the first measurement processing further includes film thickness information; and the step of obtaining the structure information further includes: obtaining, by the second measuring device, film thickness information of the sample to be detected based on the second measurement light reflected by the sample to be detected.

In measuring the film thickness information of the area for film thickness measurement, in order to avoid interference of reflected light from other areas than the area for film thickness measurement to measurement of the film thickness information, preferably, the obtaining, by the second measuring device, film thickness information of the sample to be detected based on the second measurement light reflected by the sample to be detected includes:

controlling, in a case that the second detection device is in the optical path, the carrying platform to move along the direction parallel to the surface of the sample to be detected, to move the area for film thickness measurement to the center of a detection area of the detection apparatus, adjusting a size of the stop, such that the second measurement light incident to the second measurement device is entirely formed by reflected light from the area for film thickness measurement, and obtaining film thickness information of the surface of the sample to be detected based on the second measurement light obtained by the second measurement device.

In the embodiment, the detection apparatus includes the stop, such that the size of the stop may be adjust to cause the second measurement light incident to the second measurement device to be entirely formed by the reflected light from the area for film thickness measurement, thereby accurately measuring the film thickness of the area for film thickness measurement and avoiding adverse effect of stray light on a measurement result of the film thickness.

In performing interferometric three-dimensional measurement on the sample to be detected, the objective lens switching device or the carrying platform is further configured to move along the direction perpendicular to the surface of the sample to be detected. The carrying platform is further configured to move along the direction parallel to the surface of the sample to be detected. Therefore, in a case that the area to be measured includes multiple areas for height measurement, the measurement processing further includes: moving the sample to be detected by the carrying platform, and performing the second measurement processing on each of the multiple areas for height measurement.

In a case that the area to be measured includes multiple areas for film thickness measurement, the first measurement processing further includes: moving the sample to be detected by the carrying platform, and obtaining film thickness information of each of the multiple areas for film thickness measurement based on the second measurement light.

In measuring the film thickness information of the area for film thickness measurement, in order to avoid interference of reflected light from other areas than the area for film thickness measurement to the measurement of the film thickness information.

Figure 6:
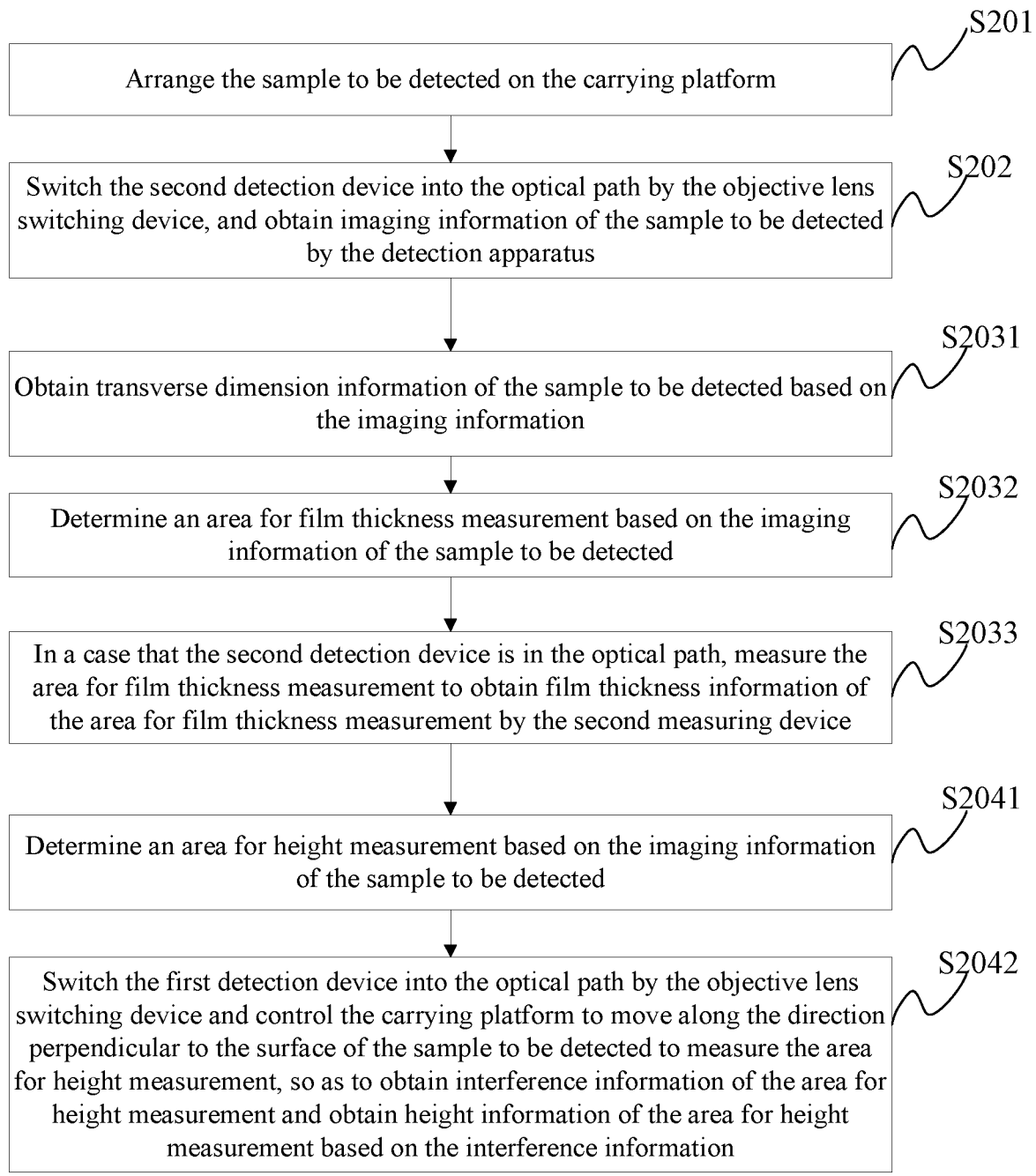
FIG. 6 is a flowchart of a detection method according to an embodiment of the present disclosure.

As shown in FIG. 6, in the embodiment, a detection method is described in detail in conjunction with an example in which the transverse dimension, the film thickness information and the height information of the sample to be detected are obtained.

The detection method includes the following steps S201 to S2042.

In step S201, the sample to be detected is arranged on the carrying platform.

In step S202, the second detection device is switched into the optical path by the objective lens switching device, and imaging information of the sample to be detected is obtained by the detection apparatus.

In step S2031, transverse dimension information of the sample to be detected is obtained based on the imaging information.

In step S2032, an area for film thickness measurement is determined based on the imaging information of the sample to be detected.

In step S2033, in a case that the second detection device is in the optical path, the area for film thickness measurement is measured to obtain film thickness information of the area for film thickness measurement by the second measuring device.

In step S2041, an area for height measurement is determined based on the imaging information of the sample to be detected.

In step S2042, the first detection device is switched into the optical path by the objective lens switching device and the carrying platform is controlled to move along the direction perpendicular to the surface of the sample to be detected to measure the area for height measurement, so as to obtain interference information of the area for height measurement and obtain height information of the area for height measurement based on the interference information.

Figure 7:
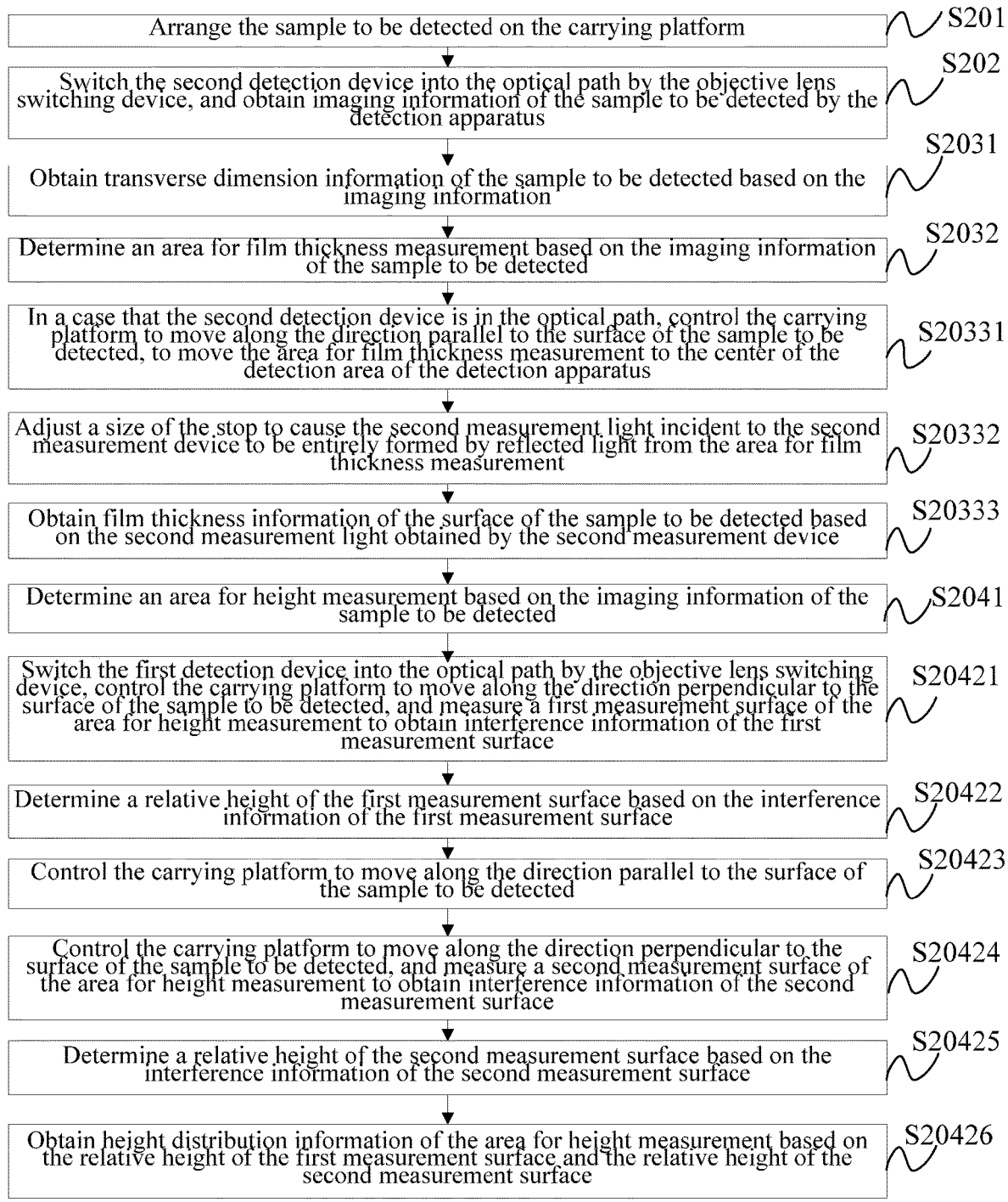
FIG. 7 is a flowchart of a detection method according to an embodiment of the present disclosure.

In measuring the film thickness information of the area for film thickness measurement, in order to avoid interference of reflected light from other areas than the area for film thickness measurement to the measurement of the film thickness information, as shown in FIG. 7, in a case that the second detection device is in the optical path, the area for film thickness measurement is measured to obtain film thickness information of the area for film thickness measurement by the second measuring device by performing the following steps S20331 to S20333.

In step 20331, in a case that the second detection device is in the optical path, the carrying platform is controlled to move along the direction parallel to the surface of the sample to be detected, to move the area for film thickness measurement to the center of the detection area of the detection apparatus.

In step S20332, a size of the stop is adjusted to cause the second measurement light incident to the second measurement device to be entirely formed by reflected light from the area for film thickness measurement.

In step S20333, film thickness information of the surface of the sample to be detected is obtained based on the second measurement light obtained by the second measurement device.

A process of obtaining the height information of the area for height measurement is provided according to an embodiment of the present disclosure. As shown in FIG. 7, the first detection device is switched into the optical path by the objective lens switching device and the carrying platform is controlled to move along the direction perpendicular to the surface of the sample to be detected to measure the area for height measurement, so as to obtain interference information of the area for height measurement and obtain the height information of the area for height measurement based on the interference information by performing the following steps S20421 to S20426.

In step S20421, the first detection device is switched into the optical path by the objective lens switching device, the carrying platform is controlled to move along the direction perpendicular to the surface of the sample to be detected, and a first measurement surface of the area for height measurement is measured to obtain interference information of the first measurement surface.

In step S20422, a relative height of the first measurement surface is determined based on the interference information of the first measurement surface.

In step S20423, the carrying platform is controlled to move along the direction parallel to the surface of the sample to be detected.

In step S20424, the carrying platform is controlled to move along the direction perpendicular to the surface of the sample to be detected, and a second measurement surface of the area for height measurement is measured to obtain interference information of the second measurement surface.

In step S20425, a relative height of the second measurement surface is determined based on the interference information of the second measurement surface.

In step S20426, height distribution information of the area for height measurement is obtained based on the relative height of the first measurement surface and the relative height of the second measurement surface.

Referring to FIG. 2 and FIG. 3, in a case that the objective lens switching device or the carrying platform is controlled to move along the direction perpendicular to the surface of the sample to be detected, multiple measurement results of interference information of the measurement surfaces of the sample to be detected can be obtained. The interference patterns corresponding to the interference information fluctuate with a variation in the distance between the sample to be detected and the first detection device. A brightness peak value of interference fringes in the interference patterns may serve as a relative height of the measurement surface. Then the interferometric three-dimensional measurement is repeated on a new measurement surface to obtain a relative height of the new measurement surface. Finally the relative heights of the two measurement surfaces are compared with each other to obtain a height distribution of an area to be measured.

As described above, a detection apparatus and a detection method are provided according to the embodiments of the present disclosure. The detection apparatus is provided with a carrying platform, a light source device, a measuring device, an objective lens switching device, a first detection device and a second detection device. The objective lens switching device is configured to switch between the first detection device and the second detection device to control the first detection device or the second detection device to be in an optical path. In a case that the first detection device is in the optical path, the measuring device may obtain height information of a sample to be detected based on first measurement light reflected by the sample to be detected and first reference light. In a case that the second detection device is in the optical path, the measuring device may obtain structure information of the sample to be detected based on second measurement light reflected by the sample to be detected. Therefore, in detecting the sample to be detected by the detection apparatus, the structure information or the height information of the sample to be detected can be obtained by switching between the first detection device and the second detection device with the objective lens switching device. In the entire process, it is not required to transfer the sample to be detected between detection apparatuses, which avoids contamination that may be caused in transferring the sample to be detected and reduces a probability that the sample to be detected is contaminated in the detection. In addition, it is not required to redetermine an area to be measured of the sample to be detected, which improves a speed of detecting the sample to be detected.

The embodiments in this specification are described in a progressive way, each of which emphasizes the differences from others, and for the same or similar parts among the embodiments, one may refer to description of other embodiments.

With the description of the embodiments disclosed above, those skilled in the art may implement or use technical solutions of the present disclosure. Numerous modifications to the embodiments are apparent to those skilled in the art, and the general principles defined herein may be implemented in other embodiments without departing from the spirit or scope of the present disclosure. Therefore, the present disclosure may not be limited to the embodiments described herein, but should comply with the widest scope consistent with the principles and novel features disclosed herein.

The invention claimed is:

1. A detection apparatus, comprising a carrying platform, a light source device, a first objective, a second objective, an objective lens switching device and a measuring device, wherein:
   the carrying platform is configured to carry a sample to be detected;
   the light source device is configured to emit detection light;
   the first objective is configured to receive the detection light and form first measurement light and first reference light, wherein the first measurement light, after being reflected by the sample to be detected, interferes with the first reference light;
   the second objective is configured to converge the detection light on a surface of the sample to be detected to form second measurement light;
   the objective lens switching device is configured to switch between the first objective and the second objective to control the first objective or the second objective to be in an optical path; and
   the measuring device is configured to obtain height information of the sample to be detected based on the first measurement light reflected by the sample to be detected and the first reference light, and obtain structure information of the sample to be detected based on the second measurement light,
   wherein the measuring device comprises a first measuring device configured to obtain imaging information of the sample to be detected based on the second measurement light reflected by the sample to be detected.

2. The detection apparatus according to claim 1, wherein the first measuring device is further configured to obtain the height information.

3. The detection apparatus according to claim 2, wherein the first measuring device comprises an image sensor.

4. The detection apparatus according to claim 3, wherein the measuring device further comprises a second measuring device configured to obtain film thickness information of the sample to be detected based on the second measurement light reflected by the sample to be detected.

5. The detection apparatus according to claim 2, wherein the measuring device further comprises a second measuring device configured to obtain film thickness information of the sample to be detected based on the second measurement light reflected by the sample to be detected.

6. The detection apparatus according to claim 5, wherein the second measuring device comprises a spectrometer.

7. The detection apparatus according to claim 5, further comprising a stop, wherein the stop is configured to limit light entering the second measuring device.

8. The detection apparatus according to claim 5, further comprising a first light splitter device, wherein the first light splitter device is configured to split signal light, to project part of the signal light to the first measuring device and project part of the signal light to the second measuring device.

9. The detection apparatus according to claim 1, further comprising a third converging lens, wherein the third converging lens is configured to converge the first measurement light reflected by the sample to be detected, the first reference light and the second measurement light to the measuring device.

10. The detection apparatus according to claim 1, further comprising a second light splitter device, wherein the second light splitter device is configured to reflect the detection light to the sample to be detected and transmit the first measurement light reflected by the sample to be detected, the first reference light and the second measurement light.

11. The detection apparatus according to claim 1, wherein the first objective comprises a first converging lens, a support surface, a compensation surface and a first beam splitter plate, wherein
the first converging lens and the support surface are arranged opposite to each other, the first converging lens is configured to converge the detection light to form converged light and transmit the converged light to the support surface;
the support surface and the compensation surface are arranged opposite to each other, the compensation surface is arranged at a side of the support surface away from the first converging lens, a reference surface is arranged at a side of the support surface facing the compensation surface;
the first beam splitter plate is arranged at a side of the compensation surface away from the support surface;
the converged light is transmitted through the support surface and the compensation surface sequentially and is incident on a surface of the first beam splitter plate, light reflected by the first beam splitter plate forms the first reference light, light transmitted by the first beam splitter plate forms the first measurement light;
the first reference light is reflected by the reference surface and the first beam splitter plate sequentially after being transmitted through the compensation surface and interferes with the first measurement light reflected by the sample to be detected;
the compensation surface is configured to perform phase compensation on the first reference light and the first measurement light to cause the first reference light and the first measurement light to meet an interference condition.

12. The detection apparatus according to claim 1, wherein
the objective lens switching device or the carrying platform is further configured to move along a direction perpendicular to the surface of the sample to be detected; and
the carrying platform is further configured to move along a direction parallel to the surface of the sample to be detected.

13. The detection apparatus according to claim 12, further comprising a piezoelectric actuator, wherein
the piezoelectric actuator is arranged at a side of the objective lens switching device facing the carrying platform; and
the piezoelectric actuator is configured to drive the objective lens switching device to move along the direction perpendicular to the surface of the sample to be detected.

14. A detection method, performed by the detection apparatus according to claim 1, the detection method comprising:
arranging the sample to be detected on the carrying platform;
performing measurement processing on the sample to be detected, wherein the measurement processing comprises at least one of first measurement processing and second measurement processing, wherein
the first measurement processing performed on the sample to be detected comprises: switching, by the objective lens switching device, the second objective into the optical path, and obtaining, by the measuring device, structure information of the sample to be detected based on the second measurement light reflected by the sample to be detected; and
the second measurement processing performed on the sample to be detected comprises: switching, by the objective lens switching device, the first objective into the optical path, and obtaining, by the measuring device, height information of the sample to be detected based on the first measurement light reflected by the sample to be detected and the first reference light,
wherein the measuring device comprises a first measuring device, the first measuring device is configured to obtain imaging information of the sample to be detected;
the measurement processing comprises the first measurement processing, the structure information comprises the imaging information of the sample to be detected;
the step of obtaining the structure information comprises: obtaining, by the first measuring device, the imaging information based on the second measurement light reflected by the sample to be detected.

15. The method according to claim 14, wherein
the measurement processing further comprises: determining an area to be measured of the sample to be detected based on the imaging information.

16. The method according to claim 15, wherein
the area to be measured comprises an area for height measurement;
the measurement processing comprises performing the second measurement processing on the sample to be detected;

the step of obtaining the height information comprises:
obtaining interference information of the area for height measurement based on the first measurement light and the first reference light, and obtaining the height information of the area for height measurement based on the interference information.

17. The method according to claim 15, wherein the measuring device further comprises a second measuring device:
the area to be measured comprises an area for film thickness measurement;
the structure information obtained in the first measurement processing further comprises film thickness information; and
the step of obtaining the structure information further comprises: obtaining, by the second measuring device, film thickness information of the sample to be detected based on the second measurement light reflected by the sample to be detected.

18. The method according to claim 15, wherein the measurement processing further comprises: obtaining a transverse dimension of the sample to be detected based on the imaging information.

19. The method according to claim 15, wherein
in a case that the area to be measured comprises a plurality of areas for height measurement, the measurement processing further comprises: moving the sample to be detected by the carrying platform, and performing the second measurement processing on each of the plurality of areas for height measurement; and
in a case that the area to be measured comprises a plurality of areas for film thickness measurement, the first measurement processing further comprises: moving the sample to be detected by the carrying platform, and obtaining film thickness information of each of the plurality of areas for film thickness measurement based on the second measurement light.

* * * * *